3,777,004
PROCESS FOR HEAP LEACHING ORES
Arthur W. Lankenau and James L. Lake, Lakewood, Colo., assignors to Hazen Research, Inc., Golden, Colo.
No Drawing. Filed May 10, 1971, Ser. No. 141,960
Int. Cl. B01d 11/00; C01g 43/00
U.S. Cl. 423—20                     26 Claims

ABSTRACT OF THE DISCLOSURE

A method for recovering metal values from large deposits of low grade ores or from high grade ores existing in small ore bodies in an outdoor operation near the mine which comprises making a pile of the ore and successively leaching selected depths of the ore from the top of the pile down by adding leaching agent and sufficient moisture to leach the metal contained in each selected depth with intermittent stirring of the selected depth of ore until the metal is solubilized followed by removal of the leached section from the pile, separation of the leach solution and solid tailings and recovery of the dissolved metal values from the leach solution.

BACKGROUND OF THE INVENTION

There are large existing bodies of ore of such low grade that it is not economical to mine and refine it to recover the metal values in it by conventional recovery techniques. Examples are low grade uranium, copper and vanadium ores, and others. There are also small ore bodies of high grade ores of these and other metals which cannot be economically processed because the total amount of metal available is too small.

The cost of refining these ores includes capital investment and maintenance of processing equipment and buildings, as well as the labor involved. A further cost is the transportation of ore in bulk from the mine to the processing site. These and related expenses make it economically prohibitive to refine the ores by conventional means. As the higher grade ores in large ore bodies reach the point of exhaustion, attention is being focused on the development of economical methods for the processing and refinement of large low grade ore bodies.

Another disadvantage attendant to present metal recovery techniques used for certain ores is the resultant pollution problems in congested areas resulting from by-product fumes and gases.

The present invention has as its principal objective a method for processing and refining both low grade and high grade ores in the open near the mine site away from congested areas and with a reduction of capital investment, housing, labor, equipment, transportation and other costs.

In accordance with the invention the ore in the mine or in piles on the ground made after crushing is leached in situ in the open air by applying moisture as required and leaching agent to a selected depth of ore accompanied by intermitting stirring of the selected depth of ore until leaching is complete for the selected layer of ore. If the ore contains sufficient moisture none is added. The layer of leached ore in a slurry is then transferred to a tank or basin for separation of the pregnant leach solution from the tailings and metal values recovered from the leach solution by ion excange solvent extraction or other conventional means. By "leaching in situ" is meant leaching in the mine without first removing the ore or leaching the ore outside the mine in a pile. The order of addition of water and leaching agent is not critical. Water may be added before or after the leaching agent or water and leaching agent may be added together.

Successive layers of ore are leached in the above manner until all of the ore has been leached. The raffinate from the ion exchange step is reused in the leaching operation. Multiple recovery operations can be conducted simultaneously with continuous use of settling basin and ion exchange equipment, with ore from the leach solution from one pile being recovered while ore from another pile is being leached.

It has been found preferable to use a depth of top section of ore about 6–12 inches for each successive leaching operation. A laboratory analysis is first made of the ore by the use of grab samples to determine the approximate ratio of leaching agent to ore necessary.

Adequate water must be present to insure optimum leaching conditions. Water must be added if the ore lacks sufficient moisture or if the leaching solution is not sufficiently dilute to supply the necessary water.

Stirring the section of the pile being leached is highly important to the process. This insures that the leaching solution does not percolate below the top section being leached and, more importantly, it insures good contact of the ore with the leaching agent. Stirring can be accomplished with conventional equipment, such as, a harrow, cultivator type instrument, etc. This stirring step exposes the ore to air for oxidizations which is beneficial to the recovery of metal values in a reduced state.

It is important that the proper amounts of moisture and leaching agent are maintained in the ore at all times and that both be uniformly distributed throughout the ore. The approximate amount of leaching agent is ascertained in advance by laboratory tests. The progress of leaching can be determined by analysis of grab samples and additional amounts of leaching agent and water added as necessary. The necessity for additional moisture is apparent from observation of the ore, the requirement being that the ore is maintained in a moist condition at all times. Uniform distribution of moisture and leaching agent is accomplished by stirring and the stirring must be done intermittently as necessary while the ore is being leached. Otherwise, there will be non-uniform leaching throughout the section and undesirable amounts of leaching agent will percolate beneath the selected top section. Finally, the stirring insures that the leaching operation is restricted to the top section. After tests indicate the leaching is complete the leached section to the required depth is readily removed with a bulldozer, front-end loader, scraper or similar device.

The preferred order of steps after the ore is in a pile with a substantially flat top surface is to uniformly sprinkle water over the top of the pile, stir the top to a depth of about 6–12 inches, add leaching solution uniformly to the top of the pile, stir the leaching solution uniformly into the wetted top 6–12 inches of the pile, followed by intermittent stirring of the ore and addition of water as required to maintain the ore in a damp condition over a period ranging from a few days to several weeks.

The leached ore after removal from the pile is transferred to a sluice box to form a slurry and the latter transferred by pumping, gravity or otherwise, to a settling basin which can be a hole in the ground or pond lined with plastic to make an impermeable pond area.

After the solids in the slurry have settled, the clear supernatant leach solution is transferred through piping to an ion exchange station where metal values are recovered from it. Other recovery procedures may be used. The raffinate from the ion exchange step is recycled to the pile areas for use as a leaching agent or is sprayed into the sluice box to pulp the leached ore.

The process was extensively applied to low grade uranium ore from the Maybell, Colo., and Baggs, Wyo., area, and to native copper and vanadium ores using concentrated sulfuric acid leaching agent. The low grade ore deposits are located too far from operating mills to economically transport them and recover metals therefrom by conventional processes. As is the case with many other low grade ores, the presently known reserves are believed to be insufficient to economically support the construction of a conventional ore processing plant at the site. The principal objective is to provide a process requiring relatively low capital investment and operating costs which produces a high purity metal product.

The process followed the following flow sheet:

FLOWSHEET FOR TREATING LOW GRADE MAYBELL AND BAGGS URANIUM ORES

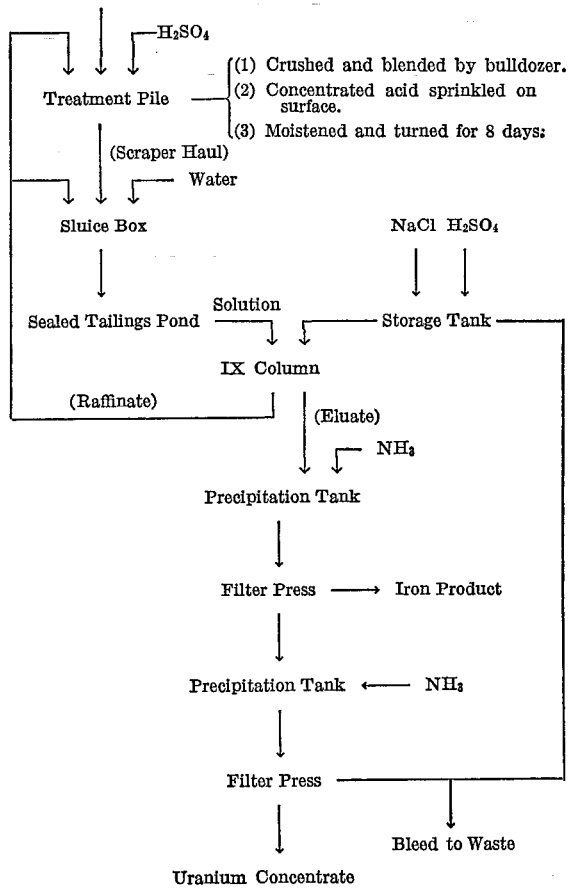

Figure 1

Truck-load lots of selected ore samples were brought to the pilot plant site from existing open pits and level piles of the ore were made preparatory to leaching. Samples from each lot were analyzed to determine the approximate ratio of acid to ore necessary for leaching. The soft sandstone ore was broken into small particles by running a tractor over the pile in several directions. Concentrated sulfuric acid was then sprinkled uniformly over the top of the ore. A spring-toothed cultivator or harrow was then used to stir the top section of the piles to a depth of between 8–12 inches. The depth of the teeth of the cultivator could be adjusted so that the depth of the section being treated could also be regulated. Water was then sprinkled uniformly over the tops of the piles to keep the upper layer moist and the ore was cultivated every day or every other day until a total of eight days had elapsed. The moisture content of the sections being treated was maintained at about 10 percent. Water was added periodically to maintain the moisture content, and the heaps cultivated regularly. The same procedure was followed using piles of ore on the ground about 8 inches deep, 12 feet wide and 40 feet long.

At the completion of the leaching operation the ore was picked up with a front-end loader and dumped onto a ¾″ screen in a sluice box located adjacent a tailings pond. The ore was washed with a solution jet to form an ore-solution slurry using a high pressure stream of acid raffinate from the ion exchange recovery step which was sprayed down into the sluice box to pulp the leached ore. The pulp was flowed to the tailings pond through a gravity launder. The pond was lined with plastic sheeting. A large excess of raffinate was used to keep the concentration of uranium in the leach liquor at a low level (0.10–0.20 gram $U_3O_8$ per liter) to minimize the uranium losses in the settled solids. The clear pregnant leach liquor was transferred from the pond through a hose to the ion exchange circuit.

The ion exchange system was operated by passing the uranium-bearing solution from the tailings pond upward through the resin in the column. Each of the two feet diameter columns was loaded with ten cubic feet of 16 x 20 mesh Dowex 21K resin, a strong base anion exchange resin. Another suitable resin is Rohm and Haas Amberlite XE–270. Other conventionally used resins are suitable. While one column was being loaded, the other column was being eluted or "stripped" to remove the extracted uranium material from the resin. The uranium was eluted from the loaded resin with one molar sodium chloride and 0.15 normal sulfuric acid solution. After elution, the resin was washed with water which was then transferred to the precipitation tank with the pregnant stripping solution.

The uranium was precipitated as yellow cake ($U_3O_8$) by neutralizing with anhydrous ammonia at a pH of about 7, in accordance with conventional procedures. The precipitation efficiency was found to be 99.8 percent from a relatively low grade elution solution.

The analysis of the yellow cake was near commercial specifications. It was found that use of a two-stage precipitation method reduced the iron content to 0.12 percent. In this method the pH is raised to 4.0 with ammonia, the resulting iron precipitate removed by filtration, and the neutralization and precipitation completed with ammonia.

The sodium content of the yellow cake was reduced to 0.26 percent by agitating the concentrate for 2 hours with a 200 gram per liter ammonium sulphate solution before filtering and washing. With two-stage precipitation and ammonium sulphate washing, the yellow cake contained only 0.05 percent chloride and 0.00 percent calcium.

EXAMPLE 1

The results set forth in the following table were obtained on a uranium ore with concentrated sulfuric acid leaching agent using the above-described procedure.

TABLE 1

| | Assays, percent $U_3O_8$ | | $U_3O_8$, percent | | Acid added, lb./ton | |
|---|---|---|---|---|---|---|
| | Ore feed | Sluice feed | Tails | Extraction | 93.2% | 100% |
| Load No.: | | | | | | |
| 1 | 0.10 | 0.10 | 0.002 | 98.0 | 44 | 41.0 |
| 2 | 0.16 | 0.12 | 0.003 | 98.1 | 37 | 34.5 |
| 3 | 0.05 | 0.04 | 0.008 | 84.0 | 48 | 44.7 |
| 4 | 0.10 | 0.10 | 0.008 | 92.0 | 34 | 31.7 |
| 5 | 0.29 | 0.20 | 0.007 | 97.6 | 49 | 45.7 |
| Average | | | 0.005 | 93.9 | 42.4 | 39.5 |

As seen from the table, a 98 percent recovery was obtained from the uranium ore in load 1 containing only 0.10 percent uranium based on $U_3O_8$. Recoveries from the five loads of low grade ore varied from 84 to 98 percent.

Agitation leaching tests run on samples taken from loads of ore leached in the pilot plant runs showed that the percentage of leaching agent per weight of ore is fairly accurately obtained in the agitation leaching tests. For example, agitation leach tests for two representative loads of typical ore indicated preferable amounts of acid of 68 and 83.5 lbs./ton and results obtained on the loads from which these samples were taken indicated that results did not vary appreciably by adding more acid than that indicated as adequate from the agitation leach tests. Conversely, acid quantities far below that required in the agitation leach tests were found to produce poor extractions. For example, for another representative load, agitation leach tests using acid at the rate of 170.5 lbs./ton provided 77.9 percent extraction of uranium as $U_3O_8$ and use of acid at a rate of only 60 lbs./ton resulted in an extraction of only 32 percent.

Adequate cultivation is critical to obtaining good results. This was illustrated in the leaching of load 5. The load was spread out to the proper dimensions, acid added, the heap stirred with the cultivator, moisture added, and the heap cultivated again. During the next 17 days, moisture was added to the heap but it was not cultivated. A sample was then taken and the heap cultivated. The sample taken before cultivation was washed and upon assay was found to contain 0.02 percent $U_3O_8$. On the twentieth day, after three days of cultivation, another sample was taken, washed and assayed. This sample was found to obtain only 0.007 percent $U_3O_8$. The cultivation uniformly distributed the acid throughout the ore and resulted in the lower uranium content of the tailings.

During pilot plant runs conducted over a three-month period on the low grade uranium ore, an overall recovery of 80.3 percent of the $U_3O_8$ in the ore into a finished concentrate was obtained in processing 63.6 tons of ore with an average feed grade of 0.14 percent $U_3O_8$. Acid added for leaching averaged 79.5 lbs./ton (100% basis) for the ores processed. The following table presents a summary of the results obtained.

PILOT PLANT RESULTS

Overall metallurgical balance:          Lb. $U_3O_8$
In:
  Feed to leaching, 62.30 tons at 0.140%
    $U_3O_8$ ---------------------------- 174.44
  Feed to repulper, 76.46 tons at 0.1125%
    $U_3O_8$ [1] ---------------------------- 172.07
Out:
  Uranium recovered by ion exchange columns (based on resin assays) [2] ---- 136.62
  Lost to settled tailings (solids, 16.89; solution, 16.50) ------------------ 33.39
  Accountable accidental losses -------- 10.76
                                                   180.77

Pilot plant recovery:
Based on calculated heads:

$$\frac{136.62}{180.77 - 10.76} \times 100 = 80.3\%$$

Based on assay heads:

$$\frac{136.62}{174.44 - 10.76} \times 100 = 83.5\%$$

Based on calculated heads and $U_3O_8$ in elution solution:

$$\frac{121.26}{165.41 - 10.76} \times 100 = 78.5\%$$

Reagent requirements:
  Leaching:                           Lb./lb. $U_3O_8$
    $H_2SO_4$ (100%) 39.5 lb./ton ---------- 16.70
  Ion exchange (split elution technique):
    $H_2SO_4$ ---------------------------- 0.97
    NaCl ------------------------------ 7.71
  $U_3O_8$ precipitation:
    $NH_3$ ------------------------------ 0.66

[1] Additional weight in feed to repulper over that in feed to leaching is due to picking up some of the earth underlying the leaching pile.
[2] $U_3O_8$ accounted for by assays of loaded elution liquor was 121.26 lb.

The above description of the recovery of uranium from low grade ores by the heap leaching process is illustrative only and not restrictive. Obviously, the process is equally effective for the recovery of metal values from high grade ores either in small or large ore deposits. The same heap leaching procedure was used to recover copper from low grade copper oxide minerals and vanadium from vanadium bearing sandstone and clay minerals. Sulfuric acid was used as the leaching agent for these ores. The process is not restricted to specific ores and leaching agents but is equally applicable to any ore and leaching agent. For example, the process can be applied to the leaching of mixed copper oxide and copper sulfide ores with acid ferric sulphate and acid ferric chloride, respectively. Other examples of the application of this process are: the leaching of manganese oxide ores with sulfurous acid, the leaching of gold and silver ores with cyanide, the leaching of tungsten ores with sodium carbonate and the leaching of uranium ores with sodium carbonate.

When acids are used as leaching agents, strong mineral acids are preferred, such as, sulfurous, sulfuric, hydrochloric and nitric acids. It is preferred to keep the acid as concentrated as possible to provide a more concentrated leaching solution; however, dilute acids can be used.

In application of the process, the ore being treated must be kept damp, but water should not be used in amounts to make it sloppy. The leaching agent and the moisture are, of course, plowed into the area of ore which is being leached. The process can be applied through successive top layers of a large pile of ore or the ore can be piled on flat ground to the depth required for a single leaching operation and the process performed in this manner. The process can be applied to surface mining to mine the ore in situ without removal from the mine by ripping the ore and leaching in place.

The following examples of the process as applied to recovery of copper and vanadium from low grade ores are, again, illustrative but not restrictive of the process.

EXAMPLE 2

The mineral used was a low grade copper oxide mineral.

The top layer of a pile of ore for a depth of about 8" was leached. Concentrated sulfuric acid was sprinkled over the top of the ore and the ore stirred for a depth of about 8". Enough water was sprinkled over the ore to give approximately 10 percent moisture. The ore was mixed daily and the moisture content maintained for approximately ten days. At the end of ten days, the ore was repulped with water for one-half hour, then filtered and washed. The copper values were recovered from the leach solution by standard recovery procedures.

The heads contained 0.80 percent copper, the ore being ground to a 28 mesh size. The results obtained from two tests are as follows:

TABLE 2

| | $H_2SO_4$, lb./ton | Tails percent Cu | Percent Cu extraction | Lb. $H_2SO_4$ per lb. Cu extracted |
|---|---|---|---|---|
| Test No.: | | | | |
| 1 | 100 | 0.28 | 65.0 | 9.62 |
| 2 | 50 | 0.47 | 41.2 | 7.60 |

EXAMPLE 3

A vanadium bearing sandstone and clay low grade ore was used. The heads contained 3.35 percent $V_2O_5$ and the ore was ground to a —6 mesh size.

Again, the top layer of a pile of ore about 8" deep was leached. Concentrated sulfuric acid was sprinkled over the top of the ore and enough moisture added to give about 10 percent water. The pile was stirred or plowed 8" deep. The mixing was continued daily for ten days with water being added throughout to maintain about 10 percent moisture. After ten days, the layer of ore which had been leached was repulped to 50 percent solids with water, filtered and washed. Vanadium values were recovered from the leach solution by standard procedures. The results obtained are tabulated as follows:

TABLE 3

| | |
|---|---|
| $H_2SO_4$, lb./ton | 400 |
| Tails, percent $V_2O_5$ | 1.53 |
| Wt. loss, percent | 18.2 |
| Percent $V_2O_5$ extraction | 66.4 |
| Lb. $H_2SO_4$ per lb. $V_2O_5$ extracted | 8.9 |

The process has a distinct advantage when sulfuric acid is used to leach ore containing large limestone ribs which are of no mineral value. Some ores have inclusions of barren limestone incorporated therein. These occasionally occur in sandstone uranium ores. When these ores are leached with sulfuric acid in accordance with the process of this invention a calcium sulfate coating is formed on the large limestone particles which protects them from acid, thus greatly decreasing the acid consumption as compared to an agitation leach procedure wherein the limestone is in small particle size readily attacked by the acid. The process eliminates the use of oxidizing agents, such as manganese dioxide, ordinarily required in agitation leaching of some type ores.

The process results in the generation and retention of heat in the ore being treated through the slight dilution of concentrated sulfuric acid when it is employed as a leaching agent. Further, the process permits the use of solar heat to assist the solubilizing action of the leaching agent. Experience has shown that at least 80 percent of the metal values in low grade ores can be recovered by the above process with a small amount of capital investment with the overall expense being low enough to make commercial operations feasible.

What is claimed is:

1. A process for the recovery in situ of metal values from a substantial lot of ore which comprises:
   (a) adding water and leaching agent for the metal value to be recovered uniformly to the top layer of a selected depth of the lot of ore in a sufficient amount to leach the metal value in the selected depth;
   (b) stirring said top layer of a selected depth to distribute moisture and leaching agent uniformly therethrough;
   (c) intermittently stirring said layer and adding water as required to maintain the ore therein in a damp condition over a period ranging from a few days to several weeks;
   (d) removing said layer including the leaching solution therein from the ore lot and forming a water slurry of it;
   (e) transferring the slurry to a settling basin and permitting solids to settle out of the slurry;
   (f) removing the clear solution from the settled solids and recovering metal value from it; and
   (g) repeating the above steps on successive layers of the ore lot from the top down until all of the lot has been leached.

2. The process of claim 1 in which the leaching agent is a strong mineral acid.

3. The process of claim 2 in which the leaching agent is sulfuric acid.

4. The process of claim 3 in which the ore is a uranium ore.

5. The process of claim 3 in which the ore is a vanadium ore.

6. The process of claim 2 in which the acid is concentrated.

7. The process of claim 1 in which the moisture content of the ore is maintained at about 10% of the weight of the ore.

8. The process of claim 1 in which sample tests are made of the ore prior to step (a) to determine the approximate amount by weight of leaching agent to ore required for complete leaching of the ore.

9. The process of claim 1 in which periodic sample tests are made of the tailings as the process progresses to determine when leaching is complete.

10. The process of claim 1 in which a pile of the ore after removal from the mine is made on the ground before leaching having a height or depth equal to at least one selected layer.

11. The process of claim 1 in which said selected layer is from about 6 to about 12 inches in depth.

12. The process of claim 1 in which the ore is gold ore and the leaching agent is a cyanide.

13. The process of claim 1 in which the ore is a silver ore and the leaching agent is a cyanide.

14. The process of claim 1 in which the ore is tungsten ore and the leaching agent is sodium carbonate.

15. The process of claim 1 in which the ore is uranium ore and the leaching agent is sodium carbonate.

16. In the process for recovering metal values from their ores by leaching the ore and recovering the metal values from the resulting leach solution, the improvement by which large lots of ore are leached in situ near the mine site or in the mine without conventional equipment and housing which comprises breaking up the top layer of the ore, leaching the top layer of the ore in situ by alternately applying to the top layer until it is completely leached water as necessary to keep it damp and leaching agent accompanied by intermittent stirring of said top layer separating said top layer of ore after it has been leached for further processing to recover the metal value, and repeating the process from the top of the lot downward on successive layers until the complete lot of ore has been leached.

17. A process for the recovery in situ of metal values from a substantial lot of ore which comprises:
   (a) analyzing samples of the ore lot to determine the approximate percentage by weight of leaching agent to ore necessary for complete leaching;
   (b) adding water uniformly to the top of a selected depth of the lot of ore as necessary to insure that said top layer is damp;
   (c) stirring said top layer of a selected depth to distribute moisture uniformly therethrough;
   (d) adding uniformly to the top of the layer a sufficient amount of leaching agent as indicated by said analysis to leach the ore value therein;
   (e) stirring said layer to distribute said leaching agent uniformly therethrough;
   (f) intermittently stirring said layer and adding water as required to maintain the ore therein in a damp condition over a period ranging from a few days to several weeks until the metal value in said layer has been substantially all leached as indicated by sample analysis;
   (g) removing said layer including the leaching solution therein from the ore lot and forming a water slurry of it;
   (h) transferring the slurry to a settling basin and permitting solids to settle out of the slurry;
   (i) removing the clear solution from the settled solids and recovering ore value from it; and
   (j) repeating the above steps on successive layers of the ore lot from the top down until all of the lot has been leached.

18. The process of claim 17 in which the percentage of water to ore is maintained at about 5–10%.

19. The process of claim 18 in which the leaching agent is concentrated sulfuric acid.

20. The process of claim 19 in which the ore is uranium ore and the metal value is uranium metal value.

21. The process of claim 19 in which the ore is vanadium ore and the metal value is vanadium metal value.

22. The process of claim 1 in which the ore is uranium ore.

23. The process of claim 1 in which the ore is vanadium ore.
24. The process of claim 1 in which the ore is gold ore.
25. The process of claim 1 in which the ore is silver ore.
26. The process of claim 1 in which the ore is tungsten ore.

References Cited
UNITED STATES PATENTS

| | | | |
|---|---|---|---|
| 625,564 | 5/1899 | Kendall | 423—29 |
| 866,625 | 9/1907 | Conedera | 423—27 |
| 1,483,567 | 2/1924 | Anjow | 423—53 |
| 3,183,058 | 5/1965 | Peter | 23—321 X |
| 2,964,380 | 12/1960 | Kolodney et al. | 23—320 |
| 2,896,930 | 7/1959 | Menke | 23—320 X |
| 3,441,316 | 4/1969 | Hannifan et al. | 75—101 X |
| 366,103 | 7/1887 | Hofmann | 75—101 |

OTHER REFERENCES

De Andrade et al.: "Chemical Treatment of Uranium Ores at the Mines in a Semi-Mobile Plant," 3rd Conf. on Peaceful Uses, vol. 12, 1965, pp. 187–193.

Galkin et al.: Technology of Uranium, 1966, p. 103, (AEC-tr-6638).

Application of Heap-Leaching to the Processing of Argentine Ores, Cecchetto et al., 3rd Conf. on Peaceful Uses, vol. 12, 1965, p. 212.

Arden: Extraction and Refining of the Rarer Metals, 1957, pp. 130–1.

CARL D. QUARFORTH, Primary Examiner

R. L. TATE, Assistant Examiner

U.S. Cl. X.R.

75—101 R; 423—3, 27, 29, 31, 53, 68